(12) United States Patent
Shen et al.

(10) Patent No.: US 9,380,109 B2
(45) Date of Patent: Jun. 28, 2016

(54) RESOURCE SYNCHRONIZATION CONTROL METHOD, DEVICE, AND SYSTEM

(71) Applicant: Tencent Technology (Shenzhen) Company Limited, Shenzhen (CN)

(72) Inventors: Wukui Shen, Shenzhen (CN); Ang Xu, Shenzhen (CN); Wei Xu, Shenzhen (CN); Wenying Xu, Shenzhen (CN); Xing Li, Shenzhen (CN); Guoyong Zhang, Shenzhen (CN)

(73) Assignee: Tencent Technology (Beijing) Company Limited, Shenzhen (CN)

( * ) Notice: Subject to any disclaimer, the term of this patent is extended or adjusted under 35 U.S.C. 154(b) by 0 days.

(21) Appl. No.: 14/431,643

(22) PCT Filed: Aug. 12, 2013

(86) PCT No.: PCT/CN2013/081296
§ 371 (c)(1),
(2) Date: Mar. 26, 2015

(87) PCT Pub. No.: WO2014/048176
PCT Pub. Date: Apr. 3, 2014

(65) Prior Publication Data
US 2015/0256614 A1    Sep. 10, 2015

(30) Foreign Application Priority Data

Sep. 29, 2012 (CN) .......................... 2012 1 0376133

(51) Int. Cl.
*G06F 15/173* (2006.01)
*H04L 29/08* (2006.01)

(52) U.S. Cl.
CPC ........ *H04L 67/1029* (2013.01); *H04L 67/1031* (2013.01); *H04L 67/1095* (2013.01); *H04L 67/34* (2013.01)

(58) Field of Classification Search
CPC ..................................................... H04L 67/142
USPC ............................................................ 709/226
See application file for complete search history.

(56) References Cited

U.S. PATENT DOCUMENTS

2006/0064554 A1 *  3/2006  Fridella ................ G06F 3/0614
                                                                    711/152
2009/0240700 A1 *  9/2009  Hayashi .............. H04L 67/1097

FOREIGN PATENT DOCUMENTS

| CN | 101795203 A | 8/2010 |
| CN | 102624569 A | 8/2012 |
| KR | 10-2012-0002344 | 1/2012 |

OTHER PUBLICATIONS

PCT Search Report and Written Opinion for PCT/CN2013/081296, dated Nov. 21, 2013.

*Primary Examiner* — Jason Recek
(74) *Attorney, Agent, or Firm* — Patterson + Sheridan

(57) ABSTRACT

A method, device and system for resource synchronization control are provided in accordance with the present disclosure. The disclosure relates to a field of information synchronization control. The method for resource synchronization control includes: inquiring, by a first terminal, from a server whether an address of the first terminal in a first terminal list is in a cleared state, the first terminal list has recorded an address of the first terminal; acquiring, by the first terminal, a resource file from a second terminal, if the address of the first terminal is in the cleared state; and notifying, by the first terminal, the server to cancel the cleared state of the address of the first terminal in the first terminal list, after acquiring the resource file.

16 Claims, 9 Drawing Sheets

RESOURCE SYNCHRONIZATION CONTROL METHOD, DEVICE, AND SYSTEM

CROSS-REFERENCE TO RELATED APPLICATIONS

This application claims the priority benefit of Chinese Patent Application No. 201210376133.X filed on Sep. 29, 2012 and entitled "Resource Synchronization Control Method, Device and System", the contents of which are incorporated by reference herein in their entirety for all purposes.

TECHNICAL FIELD

The disclosure relates to the field of information synchronization control, and particularly to a method, device and system for resource synchronization control.

BACKGROUND

In conventional information synchronization control solutions, a producer sends a resource file to a file system or inserts a resource record into a database after completing the preparation of the resource; the customer determines whether the producer has completed the preparation of the resource by detecting the resource file in the file system or the resource record in the database, and then acquires the resource from the producer.

The inventor has found at least the following problems:

On the one hand, when the producer inserts the resource record into the database, a table entry has to be established in the database corresponding to the inserted resource record, and the server has to adjust currently running programs according to the inserted resource record. All these operations increase the workload of the devices. On another hand, the time of acquiring the resource by the customer is uncertain, and the customer may acquire the resource at any time. If the producer is updating the resource while the customer is acquiring the resource, a conflict between read and write operations will occur and the system stability will be influenced.

SUMMARY

Embodiments of the disclosure provide a method, device and system for resource synchronization control which solve the read/write conflict between the producer updating the resource file and the customer acquiring the resource file.

To achieve the above effect, the following technical solutions are proposed:

A resource synchronization control method involving operations at a server side, the method including:
  acquiring, by the server, an address of a first terminal;
  establishing, by the server, a first terminal list in which the address of the first terminal is recorded;
  receiving, by the server, a resource update completed notification message sent by a second terminal, the resource update completed notification message being sent after the second terminal has completed an update procedure of a resource file;
  setting, by the server, the first terminal in the first terminal list to be in a cleared state, after receiving the resource update completed notification message sent by the second terminal, such that when the first terminal in the first terminal list is in the cleared state, the first terminal can acquire the resource file from the second terminal; and
  cancelling, by the server, the cleared state of the first terminal in the first terminal list based on a notification of the first terminal after the first terminal acquires the resource file.

A resource synchronization control method involving operations at a first terminal side, the method including:
  inquiring, by the first terminal, from a server whether the first terminal in a first terminal list is in a cleared state, the first terminal list having an address of the first terminal recorded;
  acquiring, by the first terminal, a resource file from a second terminal, if the first terminal is in the cleared state; and
  notifying, by the first terminal, the server to cancel the cleared state of the first terminal in the first terminal list, after acquiring the resource file.

A resource synchronization control method involving operations at a second terminal side, the method including:
  sending, by the second terminal, a resource update completed notification message to a server, after completing an update procedure of a resource file, such that the server can set a first terminal in a first terminal list to be in a cleared state.

A server, including:
  an address acquisition unit, configured to acquire an address of a first terminal;
  a list establishment unit, configured to establish a first terminal list in which the address of the first terminal is recorded;
  a reception unit, configured to a resource update completed notification message sent by a second terminal, the resource update completed notification message being sent after the second terminal has completed an update procedure of an resource file;
  a setting unit, configured to set the first terminal in the first terminal list to be in a cleared state, after receiving the resource update completed notification message sent by the second terminal, such that when the first terminal in the first terminal list is in the cleared state, the first terminal can acquire the resource file from the second terminal; and
  a first cancellation unit, configured to cancel the cleared state of the first terminal in the first terminal list, after the first terminal acquires the resource file, based on a notification of the first terminal.

A first terminal, including:
  a inquiry unit, configured to inquire from a server whether the first terminal in a first terminal list is in a cleared state, the first terminal list having an address of the first terminal recorded;
  a resource file acquisition unit, configured to acquire a resource file from a second terminal if the first terminal is in the cleared state; and
  a second cancellation unit, configured to notify the server to cancel the cleared state of the first terminal in the first terminal list, after acquiring the resource file.

A second terminal, including:
  a resource update notification unit, configured to send a resource update completed notification message to a server, after completing an update procedure of a resource file, such that the server can set a first terminal in a first terminal list to be in a cleared state.

A resource synchronization control system, including any of the server, the first terminal, and the second terminal as mentioned above.

In the method, device and system for resource synchronization control provided in accordance with the embodiments of the disclosure, after an update procedure of a resource file is completed, a second terminal notifies a server to set a first terminal in a first terminal list to be in a cleared state so as to indicate that the second terminal has completed the update of the resource file. The second terminal does not have to insert a resource record into a database to notify the first terminal that the resource has been updated, and the server is not required to adjust the currently running programs based on the inserted resource record.

DETAILED DESCRIPTION

In order to make the objects, technical solutions and advantages of the disclosure more apparent, the disclosure will be further illustrated in details in connection with accompanying figures and embodiments hereinafter. Apparently, the described embodiments are only a limited portion of the embodiments of the disclosure, rather all the embodiments. All the other embodiments based on the present embodiments within the disclosure, that may be acquired by those skilled in the art without an inventive effort, are intended to fall within the protection scope of the disclosure.

In scenarios where the embodiments of the disclosure are applied, three kinds of devices are included: a server, a first terminal, and s second terminal. In particular, in the scenarios, the first terminal may represent the terminal operated by the customer and the second terminal may represent the terminal operated by the producer. A resource file may be stored in the second terminal, which is to be acquired by the first terminal. The server is connected to the second terminal and the first terminal at the same time.

Embodiment 1

Figure 1:
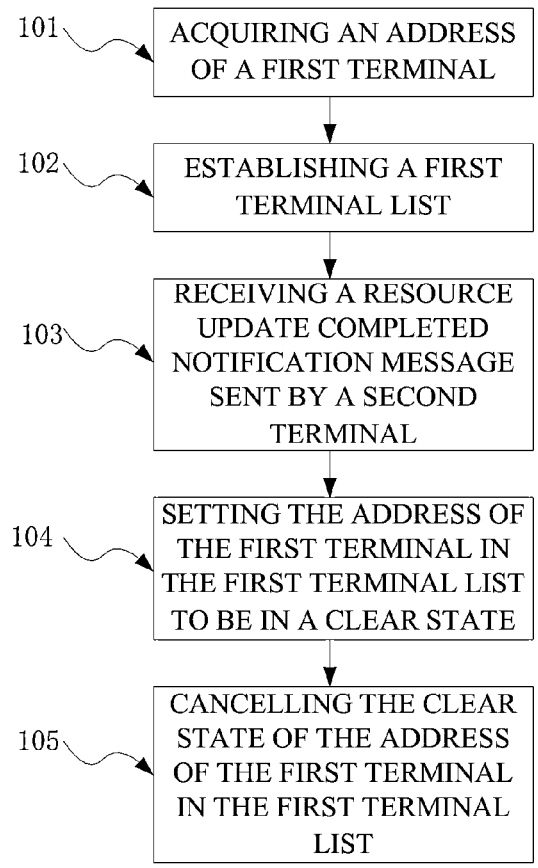
FIG. 1 is a flow diagram of a resource synchronization control method performed at a server side according to a first embodiment of the disclosure.

A resource synchronization control method involving operations at a server side is provided according to the present embodiment of the disclosure. As shown in FIG. 1, the method includes:

101, acquiring an address of a first terminal.

Before the first terminal acquires a resource file, the server acquires the address of the first terminal.

102, establishing a first terminal list.

Before the first terminal acquires a resource file, the server establishes the first terminal list in which the address of the first terminal is recorded.

103, receiving a resource update completed notification message sent by a second terminal.

When the second terminal completed the update of the resource file, the second terminal may send a resource update completed notification message to the server for informing that an updating procedure of the resource file is finished.

104, setting the address of the first terminal in the first terminal list to be in a cleared state.

After receiving the resource update completed notification message sent by the second terminal, the server may set the address of the first terminal in the first terminal list to be in a cleared state, such that when the address of the first terminal in the first terminal list is in the cleared state, the first terminal may acquire the resource file from the second terminal It is to be noted that the step of setting the address of the first terminal in the first terminal list to be in a cleared state may be performed, for example, by deleting the address of the first terminal in the first terminal list, so that the first terminal may acquire the resource file from the second terminal when the address of the first terminal in the first terminal list is deleted.

105, cancelling the cleared state of the address of the first terminal in the first terminal list.

After the first terminal acquires the resource file, it will notify the server that the acquisition of the resource file is completed. When the server receives the notification, it may cancel the cleared state of the address of the first terminal in the first terminal list.

It is to be noted that the step of cancelling the cleared state of the address of the first terminal in the first terminal list may be performed for example by adding the address of the first terminal to the first terminal list again.

The above steps 101-105 will be illustrated in the following. In the initial state of a system, a server may acquire addresses of each first terminal respectively, and stores the acquired addresses of these first terminals into a first terminal list. Then, when a second terminal finishes the resource update, the second terminal will send a resource update completed notification message to the server. After receiving the resource update completed notification message, the server may set the addresses of the first terminals in the first terminal list to be in a cleared state. When the first terminals find that their addresses in the first terminal list of the server is the cleared state, the first terminals are aware that the update of the resource file is completed. At that time, the first terminals may access the second terminal to obtain the resource file. Once the first terminals complete the acquisition of the resource file, the server will be informed. The server may cancel the cleared state of the addresses of first terminals.

Through the above steps, after the completion of an update procedure of a resource file, a second terminal may notify a server to set an address of a first terminal in a first terminal list to be in a cleared state so as to indicate that the second terminal has completed the update of the resource file. The above steps do not require the second terminal to insert a resource record into a database to notify the first terminal that the resource has been updated, and avoid the requirement for the server to adjust the currently running programs based on the inserted resource record.

Figure 2:
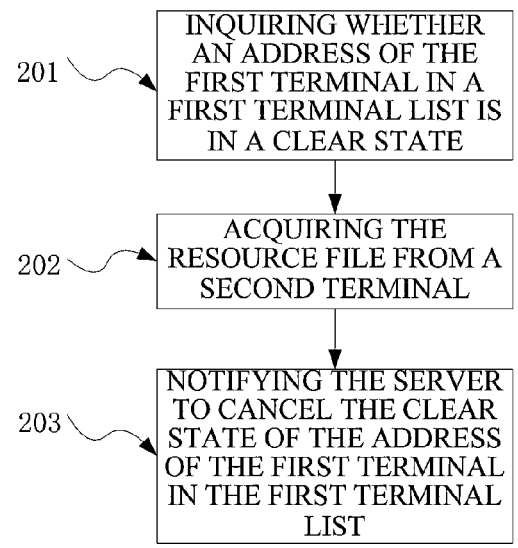
FIG. 2 is a flow diagram of a resource synchronization control method performed at a first terminal side according to the first embodiment of the disclosure.

The present embodiment of the disclosure also provides a resource synchronization control method involving operations at a first terminal side. As shown in FIG. 2, the method includes:

201, inquiring whether an address of the first terminal in a first terminal list is in a cleared state.

Before acquiring a resource file, the first terminal may first inquire whether an address of the first terminal in a first terminal list is in a cleared state, and determine whether an update procedure of the acquired resource file has completed by checking the state of the address of the first terminal in the first terminal list, and then perform the acquisition action for the resource file. If the address of the first terminal in the first terminal list is in the cleared state, step 202 will be executed; otherwise, no acquisition action for the resource file will be performed.

202, acquiring the resource file from a second terminal.

If the address of the first terminal in the first terminal list is in the cleared state, it indicates that the second terminal has completed the update of the resource file. Thus, the first terminal may acquire the resource file from the second terminal.

203, notifying the server to cancel the cleared state of the address of the first terminal in the first terminal list.

After the first terminal acquires the resource file, the first terminal may notify the server to cancel the cleared state of the address of the first terminal in the first terminal list, so as to indicate that the first terminal has acquired the resource file.

On the other hand, at the side of the second terminal, after completing the update of the resource file, the second terminal sends a resource update completed notification message to the server, such that the server may set the address of the first terminal in the first terminal list to be in the cleared state.

The present embodiment provides a resource synchronization control method, the method further includes:

before a first terminal acquires a resource file, a server acquires an address of the first terminal, an address of a second terminal, and an address of the resource file in the second terminal; when these addresses are acquired, the server establishes a first terminal list and stores the first terminal address into the first terminal list; the second terminal send a resource update completed notification message to the server after completing an update procedure of the resource file; after receiving the resource update completed notification message sent by the second terminal, the server sets the address of the first terminal in the first terminal list to be in a cleared state. The first terminal list is inquired by the first terminal. When the address of the first terminal in the first terminal list is in the cleared state, the server may acquire the address of the resource file from the second terminal and the first terminal acquires the resource file from the second terminal through the address of the resource file. After the first terminal acquires the resource file, the server cancels the cleared state of the address of the first terminal in the first terminal list.

The present embodiment provides a resource synchronization control method. In the method, after the completion of an update procedure of a resource file, a second terminal notifies a server to set an address of a first terminal in a first terminal list to be in a cleared state so as to indicate that the second terminal has completed the update of the resource file. The present method reduces the work complexity resulted from insertion of a resource record into a database by the second terminal to notify the first terminal that the resource has been updated, establishment of a table corresponding to the inserted resource record in the database, and adjustment of the currently running programs by the server based on the inserted resource record.

Embodiment 2

Figure 3:
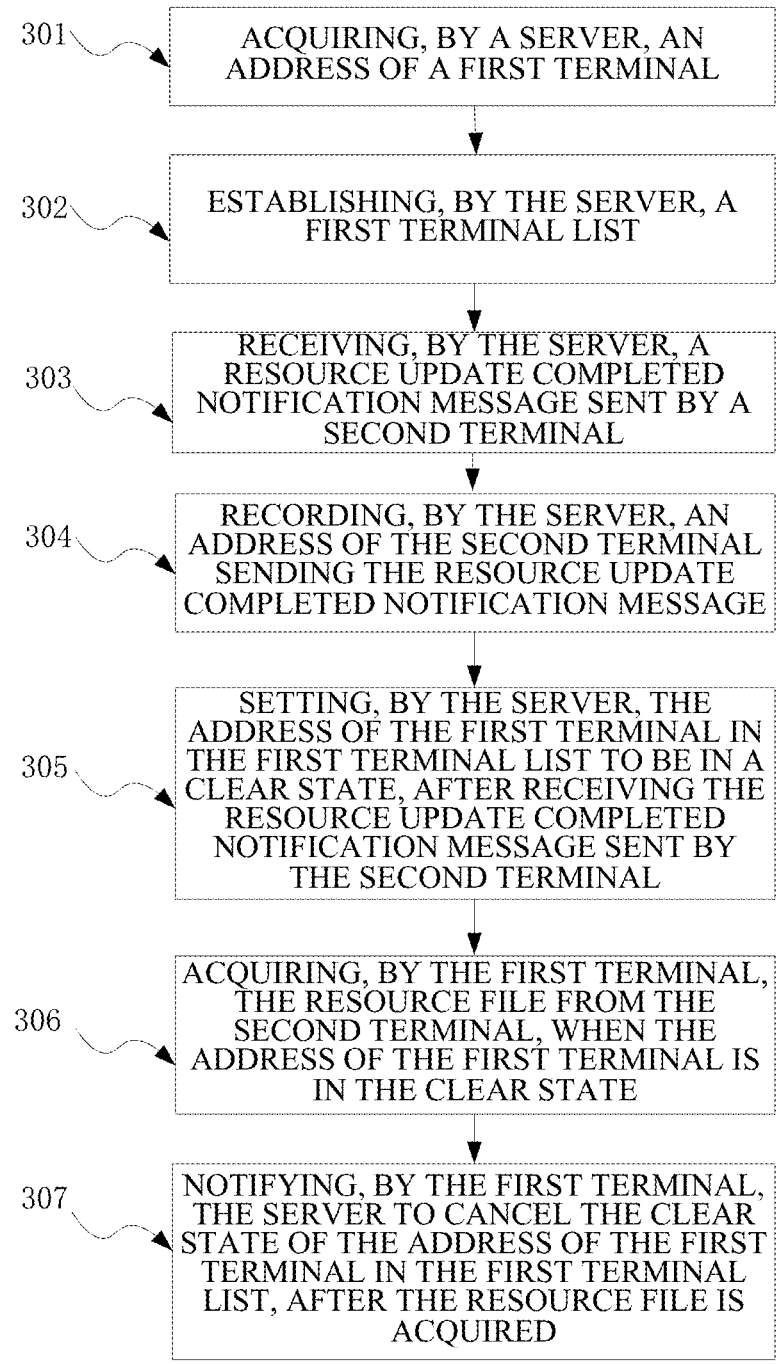
FIG. 3 is a flow diagram of a resource synchronization control method according to a second embodiment of the disclosure.

The present embodiment provides a resource synchronization control method. As shown in FIG. 3, the method includes:

301, acquiring, by a server, an address of a first terminal.

meanwhile, the server may also acquire an address of a resource file stored in a second terminal from the second terminal.

302, establishing, by the server, a first terminal list in which the address of the first terminal is recorded.

303, receiving, by the server, a resource update completed notification message sent by a second terminal.

The resource update completed notification message is sent by the second terminal after completing the update of the resource file.

304, recording, by the server, an address of the second terminal that sent the resource update completed notification message.

By recording the address of the second terminal of the resource update completed notification message, the first terminal can find the second terminal and then acquire the resource file through the address of the second terminal recorded by the server.

305, setting, by the server, the address of the first terminal in the first terminal list to be in a cleared state, after receiving the resource update completed notification message sent by the second terminal.

The first terminal can acquire the resource file from the second terminal when the address of the first terminal in the first terminal list is in the cleared state.

It is to be noted that the step of setting the address of the first terminal in the first terminal list to be in a cleared state may be performed, for example, by deleting the address of the first terminal in the first terminal list, so that the first terminal may acquire the resource file from the second terminal when the address of the first terminal in the first terminal list is deleted.

306, acquiring, by the first terminal, the resource file from the second terminal, when the address of the first terminal is in the cleared state.

In step 306, before acquiring the resource file from the second terminal, the first terminal may obtain the address of the second terminal and the address of the resource file from the server.

307, notifying, by the first terminal, the server to cancel the cleared state of the address of the first terminal in the first terminal list, after the resource file is acquired.

It is to be noted that the operation of cancelling the cleared state of the address of the first terminal in the first terminal list may be performed for example by adding the address of the first terminal to the first terminal list again.

The above steps 301-307 will be illustrated in the following. Under the initial state of the system, a server may first acquire addresses of all the first terminals and store them in a first terminal list. At the same time, the server also acquires an address of a resource file from a second terminal. Then, the second terminal may perform the update of a resource file and the first terminals may want to acquire the resource file from the second terminal. Supposing a second terminal A has completed an update procedure of the resource file, A will send a resource update completed notification message to the server. Then the server may record an address of A and set the addresses of the first terminals in the first terminal list to be in a cleared state. Thereafter, when an first terminal (for example, a first terminal B) wants to read the resource file in A, the first terminal B will check whether its address in the first terminal list of the server is in the cleared state first. As the address of B in the first terminal list is in the cleared state at this time, B will obtain the address of A and the address of the resource file from the server. Thus, B can acquire the resource file from A. After the resource file has been acquired, B will send a notification to the server, such that the server may cancel the cleared state of B's address. Before the address of B is again set to be in the cleared state, if B wants to read the resource file in A another time and the address of B in the first terminal list is not in the cleared state (which indicates that A does not perform another update of the resource file), B will stop the acquisition action of the resource file.

As can be seen, in the above steps, the second terminal may notify the server that the update of the resource file has completed; the server will set the address of the first terminal to be in the cleared state to indicate that the second terminal has completed the update of the resource file; when detecting that its address in the first terminal list is in the cleared state, the first terminal may acquire the resource file from the second terminal and notify the server to cancel the cleared state of its address after the resource file has been acquired. Through the above processes, there is no need for the second terminal to insert a resource record into a database to notify the first terminal that the resource has been updated, and the requirement for the server to adjust the currently running program based on the inserted resource record is avoided. Thereby, the scalability and stability of the system are both improved.

Figure 4:
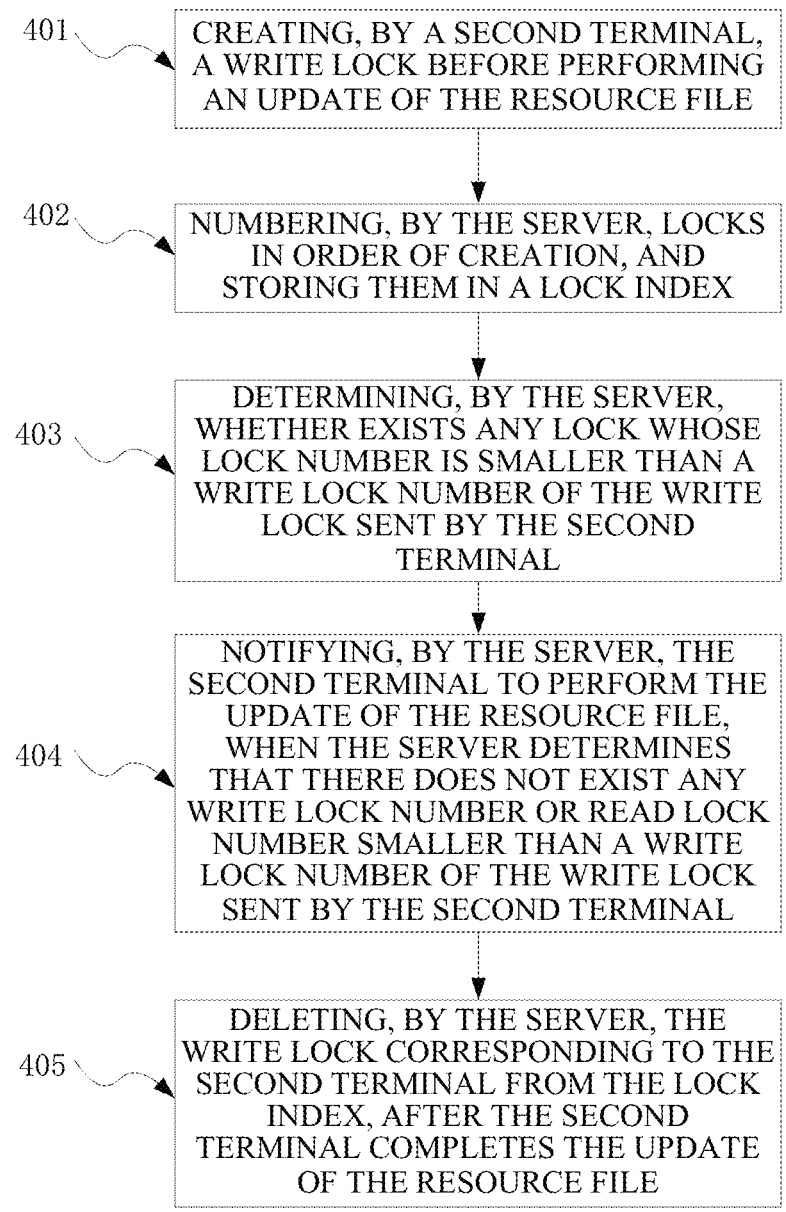
FIG. 4 is a flow diagram of a resource synchronization control method in which the update of a resource file by a second terminal is involved, according to the second embodiment of the disclosure.

In practical application, during the process of modifying a resource file by a certain terminal in a distributed system, other terminals should not be allowed to read or write the resource file, so as to avoid obtaining non-updated file or repeating writing of the file. Zookeeper is a reliable coordination system for large scale distributed systems. Zookeeper possesses a characteristic of locking files. In particular, a user terminal may create a read lock and a write lock through the Zookeeper system to lock the file. When the user terminal creates a write lock to lock the file, any other user terminal cannot update or read this file; when there is a read lock that locks the file, user terminals can read the file but cannot update the file. The embodiments of the disclosure provide a set of synchronization control system developed based upon the Zookeeper service. According to embodiments of the disclosure, the lock characteristic of Zookeeper may be implemented as follows:

A method of creating a write lock and updating a resource file based on the write lock, before a second terminal performs the update of the resource file, is shown in FIG. 4. The method includes following steps:

401, creating, by a second terminal, a write lock before performing an update procedure of the resource file.

402, numbering, by the server, locks in order of creation, and storing them in a lock index.

The locks stored in the lock index are numbered in an increasing order of the creation of the locks. The locks stored in the lock index include write locks created by the second terminal and read locks created by a first terminal.

403, determining, by the server, whether there is a lock whose lock number is smaller than a number of the write lock sent by the second terminal.

404, notifying, by the server, the second terminal to perform the update of the resource file, when the server determines that there is no write lock or read lock having a number smaller than a number of the write lock sent by the second terminal.

On the other hand, when there is a write lock number or read lock number smaller than a write lock number of the write lock sent by the second terminal, the operation for the update of the resource file will be stopped.

405, deleting, by the server, the write lock corresponding to the second terminal from the lock index, after the second terminal has completed the update of the resource file.

After the update of the resource file is completed, the second terminal notifies the server to delete the write lock corresponding to the second terminal and sends a resource update completed notification message to the server, such that the server may set an address of the first terminal in a first terminal list to be in a cleared state.

Figure 5:
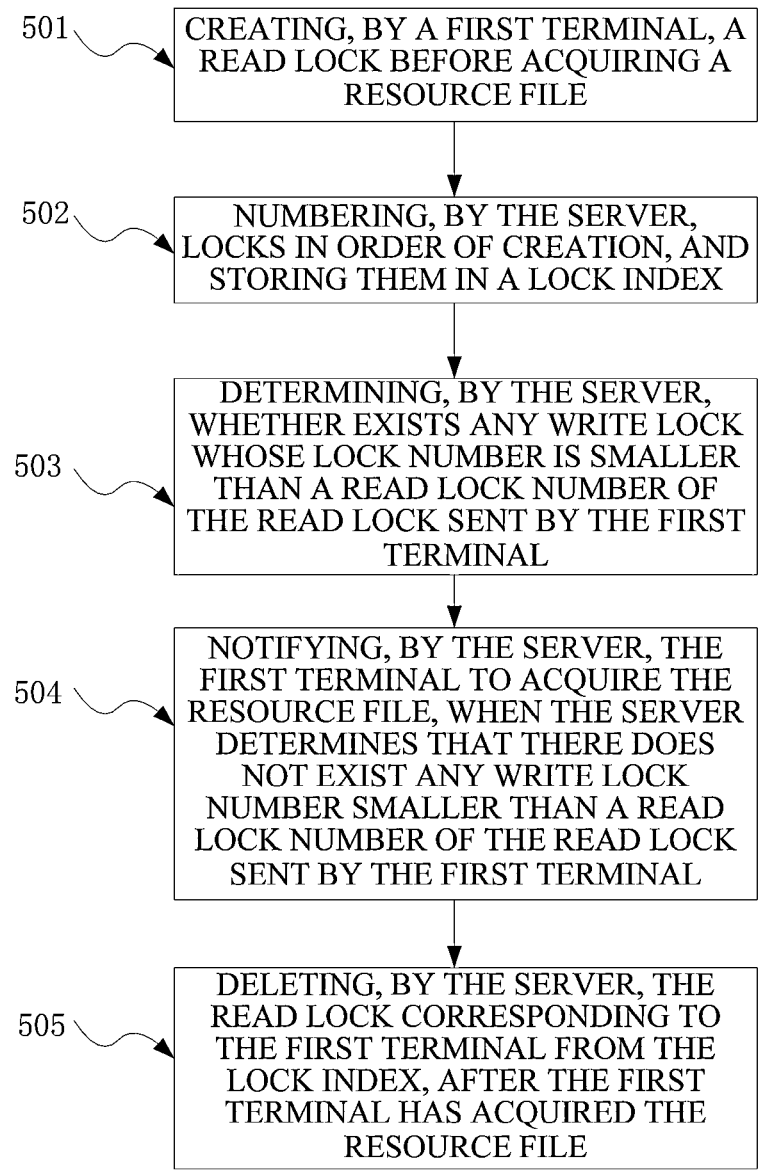
FIG. 5 is a flow diagram of a resource synchronization control method in which the acquisition of the resource file by the first terminal is involved, according to the second embodiment of the disclosure.

On the other hand, a method of creating a read lock and acquiring a resource file based on the read lock, before a first terminal performs the acquisition of the resource file, is shown in FIG. 5. The method includes the following steps:

501, creating, by a first terminal, a read lock before acquiring a resource file.

502, numbering, by the server, locks in an order of being created, and storing them in a lock index.

The locks stored in the lock index are numbered in an increasing order of the creation of the locks. The locks stored in the lock index include write locks created by a second terminal and read locks created by the first terminal.

503, determining, by the server, whether there is a write lock whose lock number is smaller than a number of the read lock sent by the first terminal.

504, notifying, by the server, the first terminal to acquire the resource file, when the server determines that there is no write lock having a number smaller than a read lock number of the read lock sent by the first terminal.

When there is a write lock number smaller than the read lock number of the read lock sent by the first terminal, the acquisition operation for the resource file by the first terminal will be stopped.

505, deleting, by the server, the read lock corresponding to the first terminal from the lock index, after the first terminal has acquired the resource file.

After the resource file is acquired, the first terminal notifies the server that the acquisition of the resource file has been completed and the server may delete the read lock corresponding to the first terminal, and the first terminal also notifies the server to cancel the cleared state of the address of the first terminal in the first terminal list.

In the above steps, the second terminal creates the write lock before performing the update of the resource file and the first terminal creates the read lock first before acquiring the resource file; the server numbers the locks in an order of being created, and storing these locks in the lock index; when the second terminal is going to update the resource file or the first terminal is going to acquire the resource file, the server determines whether there is a lock whose lock number is smaller than a write lock number of the write lock sent by the second terminal or whether there is a write lock whose lock number is smaller than a read lock number of the read lock sent by the first terminal, so as to inform the second terminal whether the update of the resource file can be performed at that moment or to inform the first terminal whether the resource file can be acquired. Through the above steps, it is possible to prevent other terminals from reading or writing the resource file when the same resource file is being written, and also prevent the second terminal from writing the resource file when the same resource file is being read. Thereby, the read/write conflict that may occur when the second terminal updates the resource file and the first terminal acquires the resource file is avoided.

Embodiment 3

Figure 6:
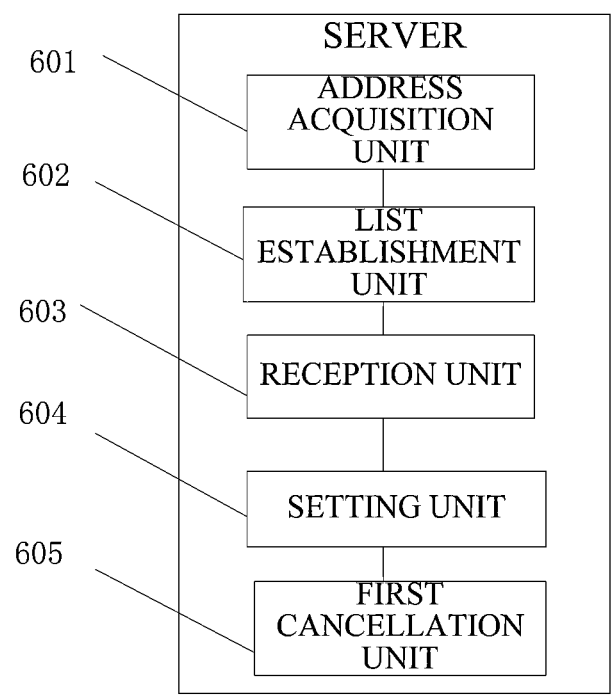
FIG. 6 is a block diagram of a server according to a third embodiment of the disclosure.

This embodiment provides a server. As shown in FIG. 6, the server includes:

an address acquisition unit 601, configured to acquire an address of a first terminal;

a list establishment unit 602, configured to establish a first terminal list in which the address of the first terminal is recorded;

a reception unit 603, configured to receive a resource update completed notification message sent by a second terminal, the resource update completed notification message being sent after the second terminal has completed an update procedure of an resource file;

a setting unit 604, configured to set the address of the first terminal in the first terminal list to be in a cleared state, after receiving the resource update completed notification message sent by the second terminal, such that when the address of the first terminal in the first terminal list is in the cleared state, the first terminal can acquire the resource file from the second terminal; and a first cancellation unit 605, configured to cancel the cleared state of the address of the first terminal in the first terminal list, after the first terminal acquires the resource file, based on a notification of the first terminal.

Figure 7:
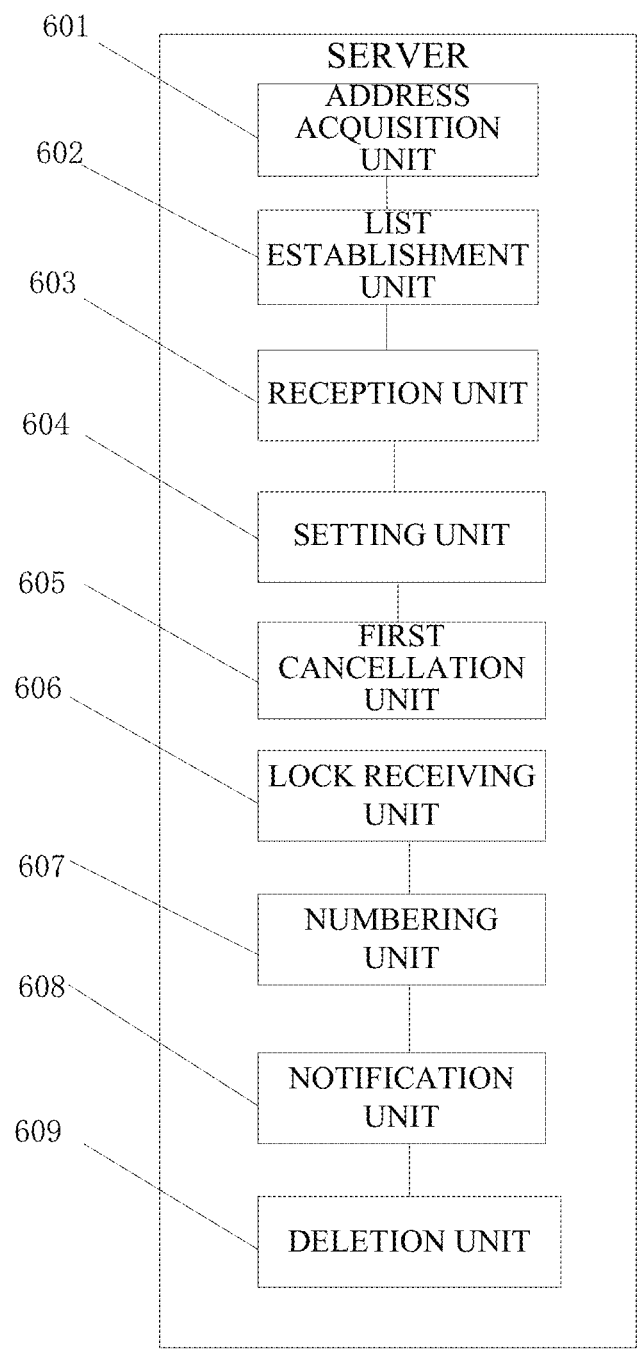
FIG. 7 is a block diagram of another server according to the third embodiment of the disclosure.

Alternatively, as shown in FIG. 7, the server may further include:

a lock receiving unit 606, configured to receive a write lock created by the second terminal before the second terminal performs the update of the resource file, and to receive a read lock created by the first terminal before the first terminal acquires the resource file from the second terminal.

The server may further include:

a numbering unit 607, configured to number locks in an order of being created and store lock numbers in a lock index;

a notification unit 608, configured to notify the second terminal to perform the update of the resource file, when the server determines that there is no write lock or read lock having a number smaller than a number of the write lock sent by the second terminal, the notification unit being further configured to notify the first terminal to acquire the resource file when the server determines that there is no write lock having a number smaller than a number of the read lock sent by the first terminal; and a deletion unit 609, configured to delete the write lock corresponding to the second terminal from the lock index after the second terminal has completed the update of the resource file, and to delete the read lock corresponding to the first terminal from the lock index after the first terminal has completed the acquisition of the resource file.

Figure 8:
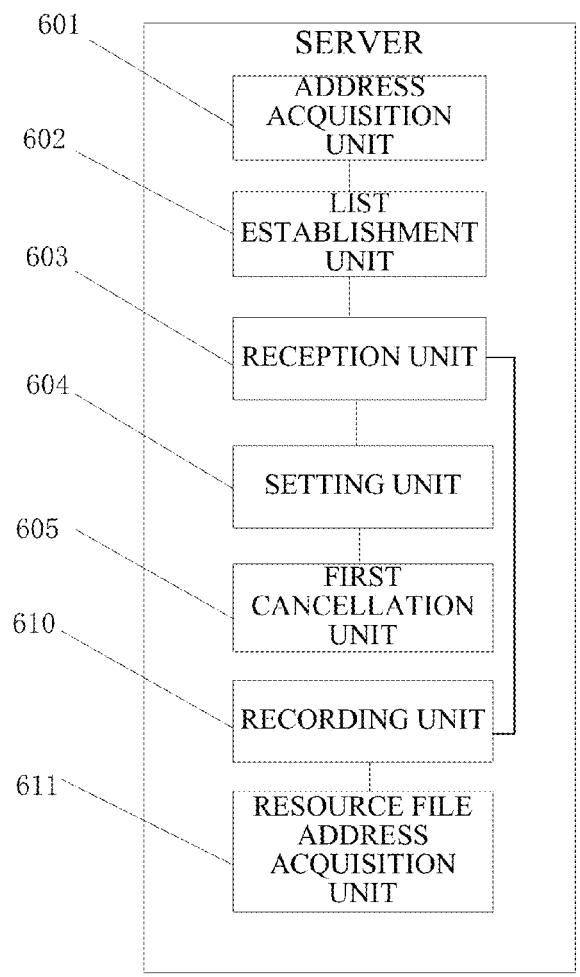
FIG. 8 is a block diagram of another server according to the third embodiment of the disclosure.

In another alternative embodiment, as shown in FIG. 8, the server may further include:

a recording unit 610, configured to record an address of the second terminal that sent the resource update completed notification message after the server receives the resource update completed notification message sent by the second terminal.

a resource file address acquisition unit 611, configured to acquire an address of the resource file, wherein the resource file is stored in the second terminal, such that the first terminal can acquire the resource file according to the address of the resource file.

Figure 9:
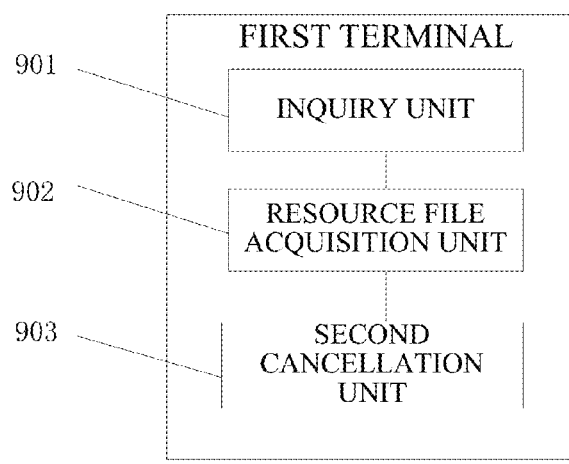
FIG. 9 is a block diagram of a first terminal according to the third embodiment of the disclosure.

A first terminal is shown in FIG. 9. The first terminal includes:

an inquiry unit 901, configured to inquire from a server whether an address of the first terminal in a first terminal list is in a cleared state, the first terminal list having the address of the first terminal recorded;

a resource file acquisition unit 902, configured to acquire a resource file from a second terminal if the address of the first terminal is in the cleared state; and a second cancellation unit 903, configured to notify the server to cancel the cleared state of the first terminal in the first terminal list, after acquiring the resource file.

Figure 10:
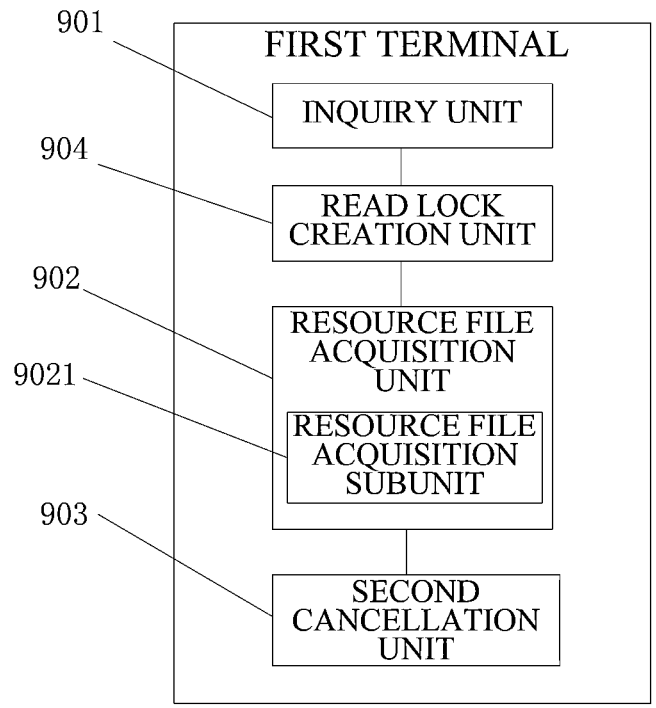
FIG. 10 is a block diagram of another first terminal according to the third embodiment of the disclosure.

Alternatively, as shown in FIG. 10, the first terminal may further include:

a read lock creation unit 904, configured to create a read lock and send the same to the server before the first terminal acquires the resource file from the second terminal, such that the server can number locks in an order of being created and store them in a lock index, wherein the resource file acquisition unit 902 further includes a resource file acquisition subunit 9021. The resource file acquisition subunit 9021 is configured to acquire the resource file from the second terminal based on a notification of the server. The notification is sent to the first terminal when the server determines that there is no write lock having a number smaller than a read lock number of the read lock sent by the first terminal.

Figure 11:
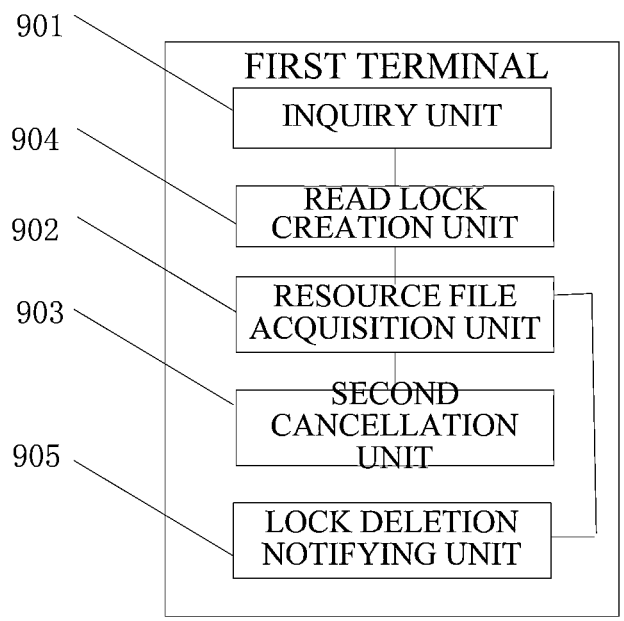
FIG. 11 is a block diagram of another first terminal according to the third embodiment of the disclosure.

In an alternative embodiment, as shown in FIG. 11, the first terminal may further include:

a lock deletion notifying unit 905, configured to notify the server, after the first terminal acquires the resource file from the second terminal, that the acquisition of the resource file is completed, such that the server can delete the read lock corresponding to the first terminal in the lock index after the first terminal has completed the acquisition of the resource file.

Figure 12:
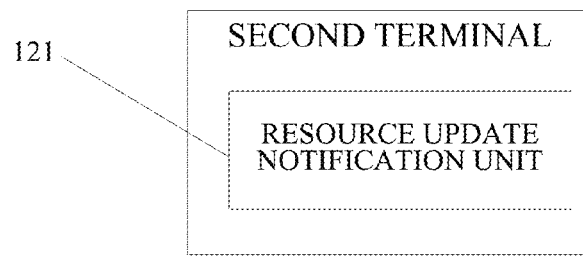
FIG. 12 is a block diagram of a second terminal according to the third embodiment of the disclosure.

A second terminal is shown in FIG. 12. The second terminal includes:

a resource update notification unit 121, configured to send a resource update completed notification message to a server, after completing an update procedure of a resource file, such that the server can set a first terminal in a first terminal list to be in a cleared state.

Figure 13:
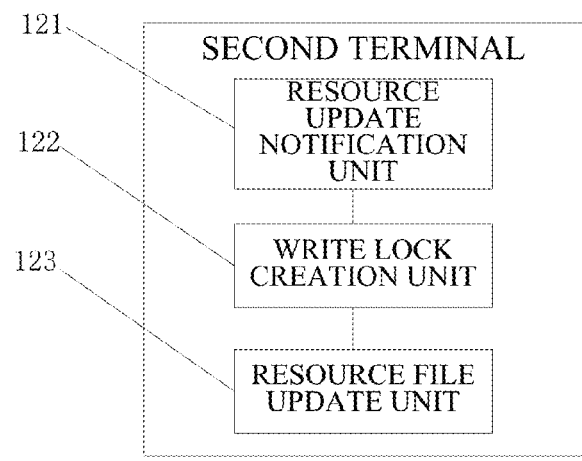
FIG. 13 is a block diagram of another second terminal according to the third embodiment of the disclosure.

Alternatively, as shown in FIG. 13, the second terminal may further include:

a write lock creation unit 122, configured to create a write lock and send the same to the server, before the second terminal performs the update of the resource file, such that the server can number locks in an order of being created and store them in a lock index; and a resource file update unit 123, configured to perform the update of the resource file, based on a notification of the server, wherein the notification is sent to the second terminal when the server determines that there is no write lock or read lock having a number smaller than a write lock number of the read lock sent by the second terminal.

A server, a first terminal and a second terminal is provided in the present embodiment. In the present embodiment, the second terminal may notify the server that the update of the resource file has completed; then the server will set the address of the first terminal in the first terminal list to be in the cleared state to indicate that the second terminal has completed the update of the resource file; when detecting that its address in the first terminal list is in the cleared state, the first terminal may acquire the resource file from the second terminal and notify the server to cancel the cleared state of its address after the resource file has been acquired. Through the above processes, there is no need for the second terminal to insert a resource record into a database to notify the first terminal that the resource has been updated, and the requirement for the server to adjust the currently running program based on the inserted resource record is avoided. Thereby, the scalability and stability of the system are both improved according to the present embodiment.

Furthermore, the second terminal creates a write lock before performing the update of the resource file and the first terminal creates the read lock first before acquiring the resource file; the server numbers locks in an order of their time of creation, and storing these locks in the lock index; when the second terminal is going to update the resource file or the first terminal is going to acquire the resource file, the server determines whether there is a lock whose lock number is smaller than a write lock number of the write lock sent by the second terminal or whether there is a write lock whose lock number is smaller than a read lock number of the read lock sent by the first terminal, so as to inform the second terminal whether the update of the resource file can be performed at that moment or to inform the first terminal whether the resource file can be acquired. Accordingly, it is possible to prevent other terminals from reading or writing the resource file when the same resource file is being written, and also prevent the second terminal from writing the resource file when the same resource file is being read. Thereby, the read/write conflict that may occur when the second terminal updates the resource file and the first terminal acquires the resource file is avoided.

Figure 14:
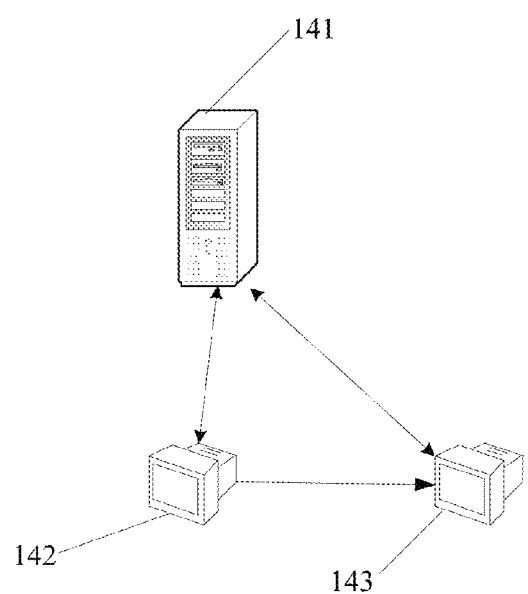
FIG. 14 is a schematic diagram showing a resource synchronization control system according to the third embodiment of the disclosure.

The present embodiment also provides a resource synchronization control system. As shown in FIG. 14, the system includes: a server 141, a first terminal 142, and a second terminal 143.

According to the system provided by the present embodiment, the second terminal 143 may notify the server 141 that the update of the resource file has completed; then the server 141 will set the address of the first terminal 142 in the first terminal list to be in the cleared state to indicate that the second terminal 143 has completed the update of the resource file; when detecting that its address in the first terminal list is in the cleared state, the first terminal 142 may acquire the resource file from the second terminal 143 and notify the server 141 to cancel the cleared state of its address after the resource file has been acquired. Through the above processes, there is no need for the second terminal 143 to insert a resource record into a database to notify the first terminal 142 that the resource has been updated, and the requirement for the server 141 to adjust the currently running program based on the inserted resource record is avoided. Thereby, the scalability and stability of the system are both improved according to the present embodiment.

Furthermore, the second terminal 143 creates a write lock before performing the update of the resource file and the first terminal 142 creates a read lock first before acquiring the resource file; the server 141 numbers the locks in an order of their time of creation, and storing these locks in the lock index; when the second terminal 143 is going to update the resource file or the first terminal 142 is going to acquire the resource file, the server 141 determines whether there is a lock whose lock number is smaller than a write lock number of the write lock sent by the second terminal 143 or whether there is a write lock whose lock number is smaller than a read lock number of the read lock sent by the first terminal 142, so as to inform the second terminal 143 whether the update of the resource file can be performed at that moment or to inform the first terminal 142 whether the resource file can be acquired. Accordingly, it is possible to prevent other terminals from reading or writing the resource file when the same resource file is being written, and also prevent the second terminal from writing the resource file when the same resource file is being read. Thereby, the read/write conflict that may be raised when the second terminal updates the resource file and the first terminal acquires the resource file is avoided.

The description of the foregoing embodiments is illustrated by setting the address of the first terminal in the first terminal list to be in a cleared state. However, this approach is only illustrative, and the disclosure may also be implemented by setting a flag bit or an identifier to indicate whether the first terminal has acquired the resource file.

The above described embodiments are merely specific implementations of the disclosure, and the scope of the disclosure is not limited to these embodiments. Any modifications, equivalent alternatives and improvements that will be appreciated by those skilled in the art will fall within the scope of the present disclosure. Thus, the scope of the disclosure is determined by the appended claims.

What is claimed is:

1. A resource synchronization control method, comprising:
   acquiring, by a server, an address of a first terminal;
   establishing, by the server, a first terminal list in which the address of the first terminal is recorded;
   receiving, by the server, a resource update completed notification message sent by a second terminal, the resource update completed notification message being sent after the second terminal has completed an update procedure of a resource file;
   setting, by the server, the first terminal in the first terminal list to be in a cleared state, after receiving the resource update completed notification message sent by the second terminal, such that when the first terminal in the first terminal list is in the cleared state, the first terminal is capable of acquiring the resource file from the second terminal; and
   cancelling, by the server, the cleared state of the first terminal in the first terminal list based on a notification of the first terminal after the first terminal acquires the resource file.

2. The method according to claim 1, further comprising:
   receiving by the server, before receiving the resource update completed notification message sent by the second terminal, a write lock created by the second terminal before the second terminal performs the update of the resource file; and
   receiving, before setting the first terminal in the first terminal list to be in the cleared state, a read lock created by the first terminal before the first terminal acquires the resource file from the second terminal.

3. The method according to claim 2, further comprising, after the server receives the write lock created by the second terminal or receives the read lock created by the first terminal:
   numbering, by the server, locks in an order of being created, and storing them in a lock index;
   notifying the second terminal to perform the update of the resource file when the server determines that there is no write lock or read lock having a number smaller than a number of the write lock sent by the second terminal;
   notifying the first terminal to acquire the resource file when the server determines that there is no write lock having a number smaller than a number of the read lock sent by the first terminal;
   deleting, by the server, the write lock corresponding to the second terminal from the lock index, after the second terminal has completed the update of the resource file; and
   deleting, by the server, the read lock corresponding to the first terminal from the lock index, after the first terminal has completed the acquisition of the resource file.

4. The method according to claim 1, further comprising, after the server receives the resource update completed notification message sent by the second terminal:
- recording an address of the second terminal that sent the resource update completed notification message, such that the first terminal is capable of finding the second terminal and acquiring the resource file through the address of the second terminal recorded by the server.

5. The method according to claim 1, further comprising:
- acquiring, by the server, an address of the resource file,
- wherein the resource file is stored in the second terminal, such that the first terminal is capable of acquiring the resource file according to the address of the resource file.

6. A resource synchronization control method, comprising:
- inquiring, by a first terminal, from a server whether the first terminal in a first terminal list is in a cleared state, the first terminal list having an address of the first terminal recorded;
- acquiring, by the first terminal, a resource file from a second terminal, if the first terminal is in the cleared state;
- notifying, by the first terminal, the server to cancel the cleared state of the first terminal in the first terminal list, after acquiring the resource file; and
- before the first terminal acquires the resource file from the second terminal, creating a read lock and sending the same to the server, such that the server is capable of numbering locks in an order of being created and storing them in a lock index,
- wherein the step of acquiring by the first terminal the resource file from the second terminal comprises: acquiring the resource file from the second terminal based on a notification of the server, the notification being sent to the first terminal when the server determines that there is no write lock having a number smaller than a number of the read lock sent by the first terminal.

7. The method according to claim 6, further comprising, after the first terminal acquires the resource file from the second terminal:
- notifying, by the first terminal, the server that the acquisition of the resource file is completed, such that the server is capable of deleting the read lock corresponding to the first terminal in the lock index after the first terminal has completed the acquisition of the resource file.

8. A resource synchronization control method, comprising:
- sending, by a second terminal, a resource update completed notification message to a server, after completing an update procedure of a resource file, such that the server is capable of setting a first terminal in a first terminal list to be in a cleared state;
- creating a write lock and sending the same to the server, before the second terminal performs the update of the resource file, such that the server is capable of numbering locks in an order of being created and storing them in a lock index; and
- performing, by the second terminal, the update of the resource file, based on a notification of the server, wherein the notification is sent to the second terminal when the server determines that there is no write lock or read lock having a number smaller than a number of the write lock sent by the second terminal.

9. A server, comprising:
- a processor; and
- a memory containing instructions, which, when executed on the processor, cause the processor to:
  - acquire an address of a first terminal;
  - establish a first terminal list in which the address of the first terminal is recorded;
  - receive a resource update completed notification message sent by a second terminal, the resource update completed notification message being sent after the second terminal has completed an update procedure of an resource file;
  - set the first terminal in the first terminal list to be in a cleared state, after receiving the resource update completed notification message sent by the second terminal, such that when the first terminal in the first terminal list is in the cleared state, the first terminal is capable of acquiring the resource file from the second terminal; and
  - cancel the cleared state of the first terminal in the first terminal list, after the first terminal acquires the resource file, based on a notification of the first terminal.

10. The server according to claim 9, wherein the instructions further causes the processor to:
- receive a write lock created by the second terminal before the second terminal performs the update of the resource file, and to receive a read lock created by the first terminal before the first terminal acquires the resource file from the second terminal.

11. The server according to claim 10, wherein the instructions further causes the processor to:
- number locks in an order of being created and store them in a lock index;
- notify the second terminal to perform the update of the resource file when the server determines that there is no write lock or read lock having a number smaller than a number of the write lock sent by the second terminal;
- notify the first terminal to acquire the resource file when the server determines that there is no write lock having a number smaller than a number of the read lock sent by the first terminal;
- delete the write lock corresponding to the second terminal from the lock index after the second terminal has completed the update of the resource file; and
- delete the read lock corresponding to the first terminal from the lock index after the first terminal has completed the acquisition of the resource file.

12. The server according to claim 9, wherein the instructions further causes the processor to:
- record an address of the second terminal that sent the resource update completed notification message after receiving the resource update completed notification message sent by the second terminal.

13. The server according to claim 9, wherein the instructions further causes the processor to:
- acquire an address of the resource file,
- wherein the resource file is stored in the second terminal, such that the first terminal is capable of acquiring the resource file according to the address of the resource file.

14. A first terminal, comprising:
- a processor; and
- a memory containing instructions, which, when executed on the processor, cause the processor to:
  - inquire from a server whether the first terminal in a first terminal list is in a cleared state, the first terminal list having an address of the first terminal recorded;
  - acquire a resource file from a second terminal if the first terminal is in the cleared state;
  - notify the server to cancel the cleared state of the first terminal in the first terminal list, after acquiring the resource file; and
  - create a read lock and send the same to the server before the first terminal acquires the resource file from the second terminal, such that the server is capable of numbering locks in an order of being created and storing them in a lock index, wherein the instructions further cause the processor to:
acquire the resource file from the second terminal based on a notification of the server, the notification being sent to the first terminal when the server determines that there is no write lock having a number smaller than a number of the read lock sent by the first terminal.

15. The first terminal according to claim 14, wherein the instructions further cause the processor to:
notify, after the first terminal acquires the resource file from the second terminal, the server that the acquisition of the resource file is completed, such that the server is capable of deleting the read lock corresponding to the first terminal in the lock index after the first terminal has completed the acquisition of the resource file.

16. A second terminal, comprising:
a processor; and
a memory containing instructions, which, when executed on the processor, cause the processor to:
send a resource update completed notification message to a server, after completing an update procedure of a resource file, such that the server is capable of setting a first terminal in a first terminal list to be in a cleared state;
create a write lock and send the same to the server, before the second terminal performs the update of the resource file, such that the server is capable of numbering locks in an order of being created and storing them in a lock index; and
perform the update of the resource file, based on a notification of the server, wherein the notification is sent to the second terminal when the server determines that there is no write lock or read lock having a number smaller than a number of the write lock sent by the second terminal.

\* \* \* \* \*